United States Patent [19]
Talbert

[11] Patent Number: 4,781,870
[45] Date of Patent: * Nov. 1, 1988

[54] LARGE MIRROR REPLICATION PROCESS

[76] Inventor: John W. Talbert, 442 Alcatraz Ave., Oakland, Calif. 94609

[*] Notice: The portion of the term of this patent subsequent to Mar. 10, 1998 has been disclaimed.

[21] Appl. No.: 476,746

[22] Filed: Mar. 18, 1983

Related U.S. Application Data

[62] Division of Ser. No. 213,292, Dec. 5, 1980, abandoned, which is a division of Ser. No. 860,015, Dec. 12, 1977, Pat. No. 4,255,364.

[51] Int. Cl.$^4$ ............................................. B29D 11/00
[52] U.S. Cl. ........................................ 264/1.9; 264/2.5; 264/28; 264/102; 264/219; 264/261; 264/334; 264/510; 264/571
[58] Field of Search .................. 264/1.9, 2.5, 28, 261, 264/219, 334, 102, 510, 571

[56] References Cited

U.S. PATENT DOCUMENTS

| | | | |
|---|---|---|---|
| 3,317,640 | 5/1967 | Jones | 264/2.5 |
| 3,508,987 | 4/1970 | Burkley et al. | 264/261 |
| 4,061,518 | 12/1977 | Burroughs et al. | 264/2.5 |
| 4,124,277 | 11/1978 | Stang | 264/1.7 |
| 4,129,628 | 12/1978 | Tamutus | 264/25 |
| 4,255,364 | 3/1981 | Talbert | 264/1.9 |

FOREIGN PATENT DOCUMENTS 2412180  10/1975  Fed. Rep. of Germany ...... 264/334

OTHER PUBLICATIONS

*The Encyclopedia of Patent Practice and Invention Management*, Calvert, Reinhold Publishing Co., N.Y., 1964, p. 3.

*Primary Examiner*—James Lowe
*Attorney, Agent, or Firm*—Townsend and Townsend

[57] ABSTRACT

A mirror—typically of the spherical or aspherical variety—is replicated on a large scale (in the order of 2′×4′) to an optical accuracy in the range of less than one arc minute. An optical master is created by heat shrinking and holding an acrylic sheet to a steel substrate of the same shape as desired mirror in the constant presence of a vacuum at the steel-acrylic interface. The acrylic is optically polished to complete the master. The master is then appropriately dammed to the mirror dimension and poured with subsequently cured epoxy so that the epoxy forms the optical surface of the replicated mirror. A backing master—created by substantially the same process as the optical master—allows fabrication of a backing, composed of a series of adhesive layers typically sandwiching a core material such as commercial honeycomb therebetween, to be made with a curvature substantially similar to the curvature of the replicated optical surface. This backing is laid up against and dammed around the replicated epoxy optical surface with an interstice of pre-selected dimension created between the replicated epoxy surface and backing. An adhesion is produced between the backing and replicated surface by pouring a curing adhesive rubber into the defined interstice, this adhesion occurring substantially without any backing irregularity "print through" to the optical surface. Thereafter, a peeling release of the optical master from the adhered replicated optical surface and backing is effected by flexing (as by shrinking of the acrylic dome through cold nitrogen gas). A lightweight replicated mirror of substantial strength separated from reusable optical master results.

16 Claims, 3 Drawing Sheets

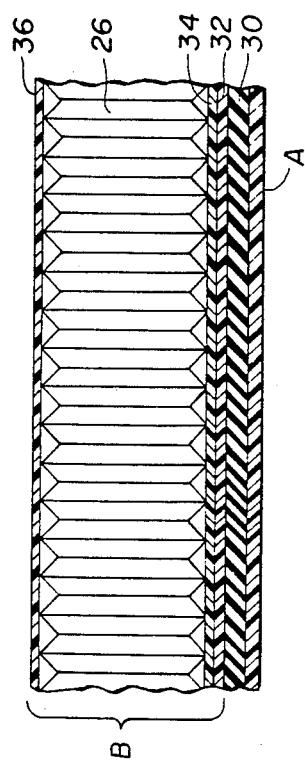
FIG._3.
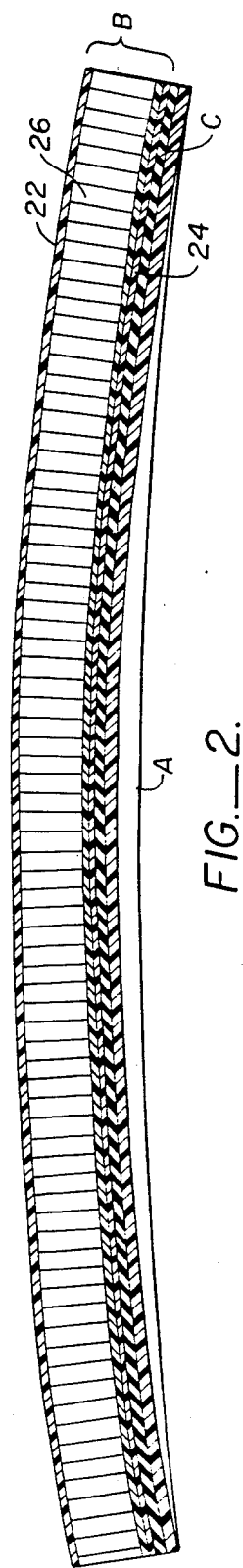
FIG._2.
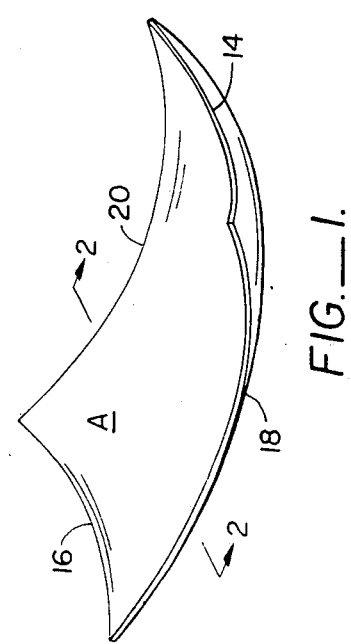
FIG._1.

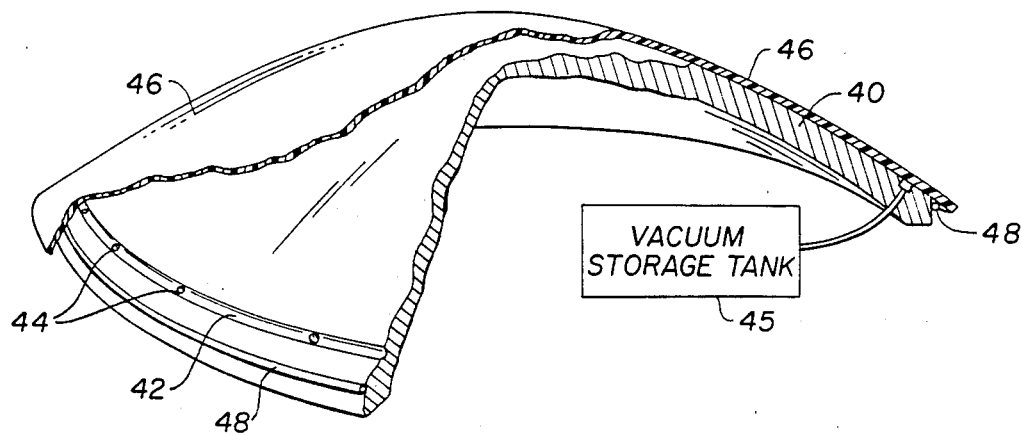
FIG.—4a.
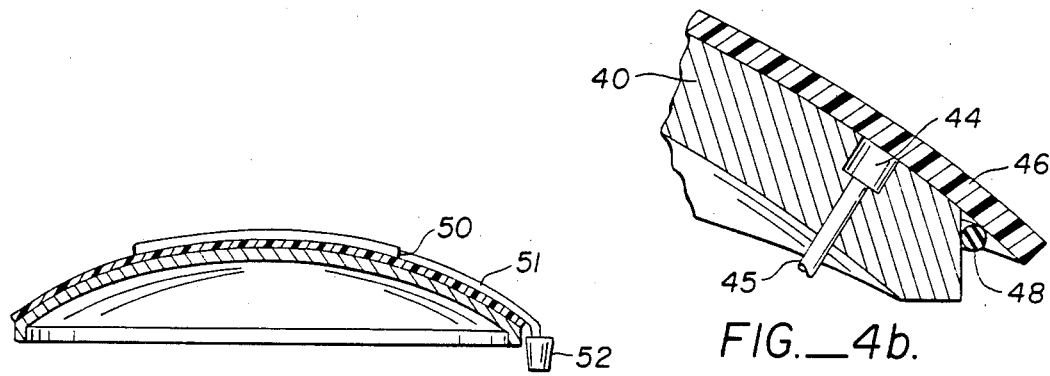
FIG.—4b.
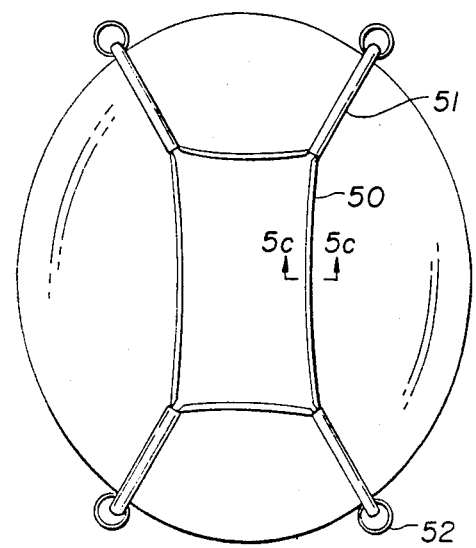
FIG.—5a.
FIG.—5b.
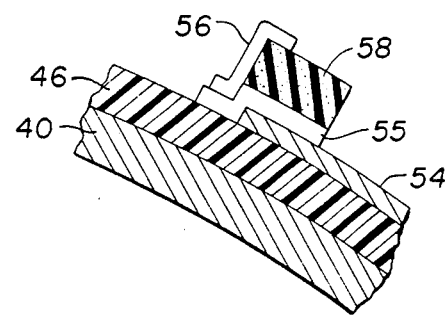
FIG.—5c.

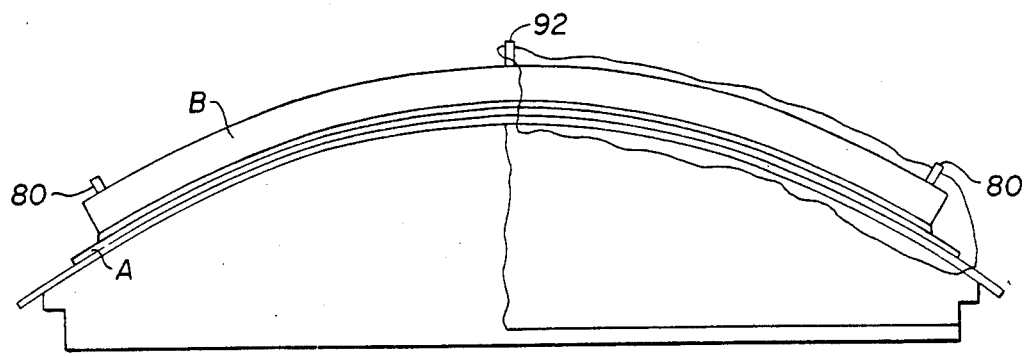
FIG._6a.
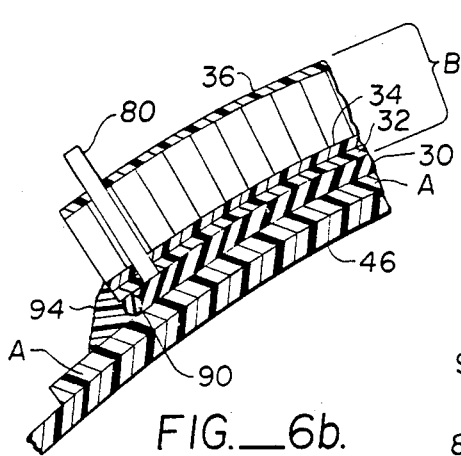
FIG._6b.
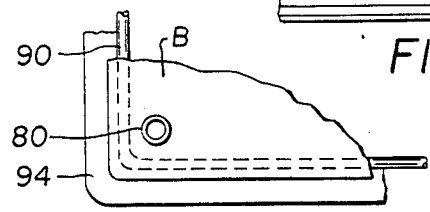
FIG._6c.
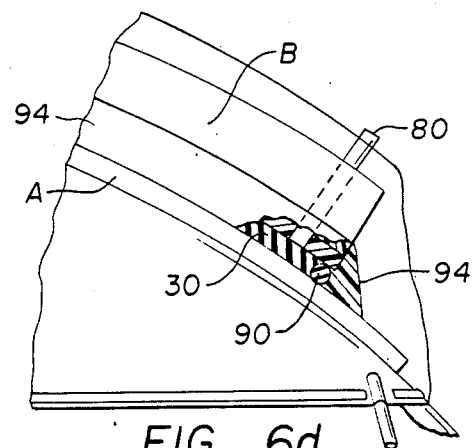
FIG._6d.
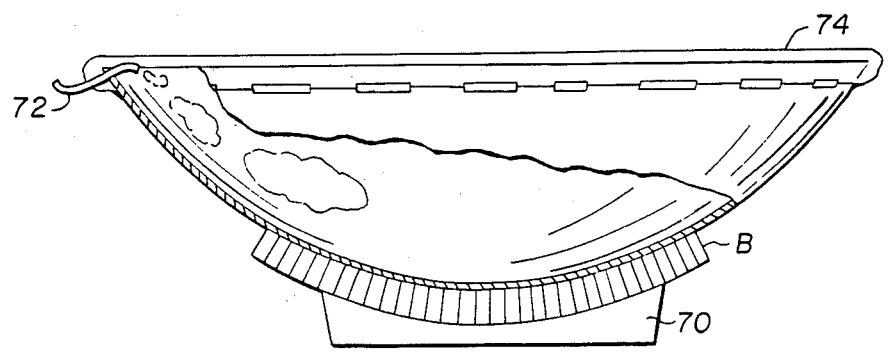
FIG._7.

LARGE MIRROR REPLICATION PROCESS

This is a division of application Ser. No. 06/213,292, filed Dec. 5, 1980 and now abandoned which in turn was a division of application Ser. No. 05/860,015, filed Dec. 12, 1977 and now U.S. Pat. No. 4,255,364.

This invention relates to the replication of optical surfaces and specifically relates to a replicated mirror with an epoxy front surface that is cast over an acrylic steel braced mold and attached by a layer of adhesive rubber to an sandwiched fiber-reinforced honeycomb backing. Subsequent separation of the completed mirror is accomplished by flexure, typically by shrinking, of the underlying optical mold.

SUMMARY OF THE PRIOR ART

The need for replicated mirrors of relatively large dimension is known. For example, in creating large-scale reflective mirror arrays for the projection of images for flight simulators such mirrors are extremely useful. In such simulators they can produce a duplicated cockpit view with a field of view similar to that field of view experienced in an aircraft under actual flight. Other applications of these arrays can include visual and TV projection systems, solar energy collectors, laser systems, millimeter and submillimeter radio reflectors and the like.

For such arrays, conventionally ground large-scale mirrors are too expensive and too heavy. Small conventionally ground mirrors pieced togehter in segments to form an array are likewise insufficient. Commonly they are expensive to manufacture. Moreover, it is difficult at best to control the tolerances of such mirrors to precise and identical radii in order to prevent optical distrubance at the interface of the discrete mirrors in the array. Undesired optical distortions can result.

Replicative processes heretofore used have comprised the use of a glass master. This glass master has been placed under a high physical vacuum in the order of $10^{-6}$ Torr and thereafter a deposition coating produced in the presence of the vacuum.

At least two factors have prevented the use of these optical replicative processes for large-scale mirrors.

First, large high vacuum chambers would be required for fabrication of glass replicated mirrors of large dimension. Such vacuum chambers are few in existence and very expensive to manufacture, procure or operate.

Second, and perhaps more important, the replicated surfaces are extremely difficult to remove from their glass masters. The difficulty of removal correspondingly increases as the replicated surface increases in size. Breakage of the replicated surface, or of the expensive underlying optical master (typically of ground and polished glass), is common. As the state of the art now stands, replication is not used to produce large optical surfaces.

It should be noted that in prior unsuccessful attempts to produce the present process, a problem of backing irregularity "print-through" has been encountered. Irregularities are present in reinforcing and backing surfaces that have been created for releasing and supporting the thin replicated optical surfaces. Conventional adhesive techniques almost always resulted in "print-through" of these inevitable irregularities of the backing onto the optical surface. Distortions of the optical surface ultimately result. When the supported optical surface has been separated, these minute distortions degrade the optical quality of the surface, principally at visible and near infrared wavelengths.

SUMMARY OF THE INVENTION

A mirror—typically of the spherical or aspherical variety—is replicated on a large scale (in the order of 2'×4') with an optical accuracy in the range of less than one arc minute. An optical master is created by heat-shrinking and holding an acrylic sheet to a steel substrate of the same shape as desired mirror with a vacuum constantly present at the steel-acrylic interface. The acrylic is optically polished to complete the master. The master is then appropriately dammed to the mirror dimension and poured with subsequently cured epoxy, the epoxy forming the optical surface of the replicated mirror. On a backing master—created by substantially the same process as the optical master—a series of adhesive layers, typically sandwiching a core material such as commercial honeycomb therebetween, are laid up to form a mirror backing substantially similar to the curvature of the replicated optical surface. This backing is laid up against and dammed around the replicated epoxy optical surface with an interstice of pre-seclected dimension between the replicated epoxy surface and backing. An adhesion is produced between the backing and replicated surface by pouring a curing adhesive rubber into the defined interstice, this adhesion occurring substantially without any backing irregularity "print through" to the optical surface. Thereafter, a peeling release of the optical master from the adhered replicated optical surface and backing is effected by flexing (as by the use of cold nitrogen gas to shrink the acrylic dome).

For mirror applications in the far infrared to millimeter wavelength region, the mirror backing may be laid up directly on the back surface of the replicated casting, omitting the adhesive rubber layer.

A lightweight mirror of substantial strength separated from a reusable optical master results.

OTHER OBJECTS AND ADVANTAGES OF THE INVENTION

An object of this invention is to enable the manufacture of a large scale replicated optical surface having an accuracy in the range of less than one arc minute. A replicated epoxy front optical surface which typically is optically coated is adhered to a reinforced backing by a layer of cured rubber, this rubber preferably an RTV rubber. The resultant mirror product is lightweight, large and capable of disposition in a discrete array where duplicate side-by-side mirrors perform duplicate optical reflection to form an undisturbed and undistorted reflected image.

An advantage of the replicated product of this invention is that large arrays of mirrors are for the first time made practical. The use of a replication process prevents variations in optical curvature which create visual distortions that would otherwise spoil the visual appearance of a composite image produced by non-replicated mirrors.

A further object of this invention is to disclose a process of creating a reusable optical master for further replications. According to this aspect of the invention a steel substrate of any desired shape is first machined to the desired mirror shape of the replicated product. On this steel substrate a continuous groove is scribed at a preselected distance from its periphery and connected with a manifold which communicates the groove to a vacuum. The steel substrate surface is thereafter optically ground to a fine texture in order to remove surface irregularities from machining. A substantially mating acrylic sheet (again preferably in the shape of the mating steel) is laid up against the steel substrate, shunk and then stress relieved in the presence of heat. All the while during and after the stress relieving process and replicative process, the acrylic is vacuum-held to the steel. Once the acrylic is optically polished, an improved and reusable acrylic optical master results.

An advantage of this aspect of the invention is that the resultant optical master is flexible. Specifically, it can be flexed as by low temperature shrinking, for release from its surface of the replicated optical surface of poured and cured epoxy.

A further advantage of this aspect of the invention is that a similarly produced acrylic steel master can form the mold on which the backing for an optical surface is fabricated.

Yet another advantage of the optical master of this invention is that the optical master comprises a substrate of sufficient strength so that support of both the replicated optical surface and a backing being laid up and adhered to the replicated optical surface can occur with accuracy of shape maintained.

A further object of this invention is to disclose a process of fastening the reinforcing backing to the replicated optical surface, without backing irregularity "print through." According to this portion of the invention, a backing is prepared, this backing typically being a composite of fiberglass layers with conventional honeycomb sandwiched therebetween. This backing is laid up to the replicated optical surface on the optical master. Typically, the backing is spaced from the optical master to form an interstice, which interstice is dammed around its periphery. Thereafter, rubber is poured into the interstice and cured.

An advantage of this aspect of the invention is that adherence between the replicated optical surface and backing occurs with a minimum of backing irregularity "print through." The optical appearance of the resultant product is not spoiled due to such print through.

A further advantage of this invention is that the adherence between the reinforcing backing and the replicated optical surface is sufficient to permit the relatively high stresses that occur in separation of the replicated optical surface from the optical master. Separation or breakage of the replicated surface from its backing does not occur in the removal process.

Yet another object of this invention is to disclose a process of separating a large replicated mirror from the disclosed optical master. According to this aspect of the invention, the replicated optical surface has its backing laid up and adhered to it while it still remains on the optical master. Thereafter, the underlying optical master is removed from steel and flexed, as by shrinking (here preferably produced by cooling). When such flexure occurs, the replicated optical surface peels away from the optical master.

An advantage of this aspect of the invention is that the large optical surface comes off without breakage of either replicated surface or optical master.

Yet a further advantage of this aspect of the invention is that the optical master is released ready for reuse in a subsequent replication of an optically identical mirror.

Yet a further advantage of this invention is the production of a series of mirrors, all of which can subsequently be arrayed to produce a homogeneous optical reflecting array.

Yet a further object of this invention is to disclose a mirror construction that allows the physical characteristics of the finished mirror to be tailored to a wide range of applications. According to this aspect of the invention, a series of epoxy layers are cast on a master to form a replicated reflecting surface and a backing is subsequently attached.

An advantage of this aspect of the invention is that a mirror structure that is substantially free of residual stresses results. This makes it possible to cut the fabricated mirrors anywhere on its surface, thus making a wide variety of sizes and irregular shapes feasible.

Another advantage of this aspect of the invention is that the formulation of the epoxy mixtures may be varied to achieve specific physical properties appropriate to a given application.

Other objects, features, and advantages of this invention will become more apparent after referring to the following specification and attached drawings in which:

BRIEF DESCRIPTION OF THE DRAWINGS

FIG. 1 is a perspective view of the complete replicated optical mirror;

FIG. 2 is a side elevation section taken through the mirror of FIG. 1 illustrating the mirror's composite formation;

FIG. 3 comprises an enlarged section of a portion of the mirror shown in FIG. 2, this enlarged section illustrating the discrete layers comprising the replicated optical mirror;

FIGS. 4a and 4b are respective perspective and detail of the steel and acrylic domes forming the optical master for the replicative process of this invention, it being noted that the production of the backing of this mirror occurs on a dome of substantially identical construction;

FIGS. 5a, 5b and 5c are illustrations of the optical master dammed for the pouring of the replicated optical surface illustrating respective elevation, plan, and side elevation details of the dam utilized in preparing the mirror of this invention;

FIGS. 6a–6d are views illustrating the adhering of a backing to the replicated optical surface with the details of FIGS. 6b–6d here illustrating the preferred placement of fill tubes and vacuum tubes for forming an adhesive rubber interstice between the replicated optical surface and backing before removal of the replicated optical surface from the disclosed optical master;

FIG. 7 is an illustration of the optical master being flexed (by shrinking from liquid nitrogen cooling) to peel the replicated reflector from the master before optical coating by conventional optical techniques.

MIRROR SURFACE

Referring to FIG. 1, replicated optical surface A (which may have an outline of any desired shape) is shown cut to a rectangular interval along parallel side edges 14, 16 and parallel longitudinal edges 18, 20. When placement of the replicated mirror in an overall spherical optical array is desired, it should be understood that the respective edges 14, 16, 18 and 20 are all cut so that their respective edges match the curvature of the optical array.

As an aside, it will hereinafter be assumed that the reflective replicative surface A is conventionally coated as by metallic vacuum evaporation (or optical coating)

with available commercial techniques; that reflective surfacing by prior art techniques will not further herein be discussed.

Referring to FIG. 2, the three main components of the large scale replicated mirror can be understood. First, the optical surface A is shown.

Second, the reinforcing backing B is illustrated. As typically shown here, it comprises fiberglass laminates 22, 24, sandwiching a conventional honeycomb core 26 therebetween. Finally adherence of the backing B to the replicated optical surface A is produced by a layer of curing rubber C, preferably RTV rubber, poured in the interstice between the backing B and the replicated optical surface A.

Referring to FIG. 3, an enlarged section of the mirror of FIG. 2 is illustrated to show a preferred construction of the mirror. Starting from the reflective surface A to that portion of the backing B away from the reflective surface A, construction of the mirror in its respectively fabricated serial laminates can be sequentially described. Typically, the optical surface of the mirror comprises an epoxy layer poured from a non-thixotropic mixture of epoxy. This layer, which is approximately 40 to 60 thousandths of an inch thick, is the optical surface generally denominated by the letter A. The silicone rubber bond of RTV rubber 30 adheres at one interface on the reverse side of the optical surface of the layer A and at the other side to the backing B.

The portion of the backing B immediately adjacent the rubber layer 30 includes a front surface of substrate epoxy 32 approximately 15 thousandths of an inch thick. A first layer of six ply resin-soaked fiberglass cloth laminate with alternating fiber angular alignment 34 and a second similarly constructed layer 36 conventionally sandwiches therebetween honeycomb 26. As is well known in the honeycomb arts, such a sandwich construction produces a backing of great rigidity, high strength to weight ratio, and is extremely lightweight, all of which renders the disclosed backing particularly suitable for use with this invention.

It should be noted at this juncture that the disclosed product—a lightweight replicated and large optical surface—is extremely desirable. However, the process of replicating such optical surfaces has heretofore not been disclosed.

OPTICAL MASTER

Referring to FIG. 4, steel dome 40 is fabricated and stressed relieved by conventional prior art techniques. During machining of the dome, the dome is scribed with a groove around its entire circumference approximately 4 inches from its periphery at a scribe 42. This groove is provided with manifold holes 44, which manifold holes are conventionally communicated to a conventional regulated vacuum source 45. The resultant manifold enables a subsequently placed acrylic dome 46 to be held under atmospheric pressure in adherence to the steel dome. Thereafter, and to begin a matrix of optical replicative precision, the surface of the steel dome 40 is optically ground to the shape of the ultimately desired replicated mirror. The steel dome has an approximate surface accuracy in the order of 1 to 2 thousandths of an inch.

Thereafter, an acrylic dome 46 being conventionally blown to substantially the same direction as steel dome 40 is placed over the optically ground and manifolded steel dome 40. It is then sealed by O-ring seal 48 at the periphery. After sealing and with the vacuum continuously communicated to the manifold, the acrylic is shrunk to the dome.

The preferred dimension of the acrylic liner is approximately a quarter of an inch thick and can be conventionally blown in a manner not unlike that used in conventional housing skylights. Shrinking the acrylic liner to the dome comprises an annealing process preferably of approximately 24 hours at 200° F., during which any concentrated residual stresses are removed.

It should be understood at this juncture that the acrylic liner remains on the steel dome throughout the rest of the manufacturing process with the vacuum maintained at the interface between the liner and steel dome. This maintenance of the vacuum continues not only through the fabrication of the optical master but through the continuous replication and re-replication of optical surfaces using the formed optical master.

Completion of the optical master occurs when the outer surface 46 of the dome is optically ground and polished to the desired tolerance of less than one arc minute. The polished outer optical surface of the acrylic then forms the optical master for the replicative process herein. It is important to note that where concave mirrors are being fabricated the steel dome and acrylic liner are convex. It should likewise be understood that where convex surfaces are being formed the steel dome and acrylic master would be concave. Likewise, the surface produced could equally well be flat.

REPLICATION PROCESS

Referring to FIGS. 5a–5c, the next step is to pour epoxy for the replicated optical surface onto the optical master. First, the epoxy is prepared in accordance with the following formulation:

| | Preparation of Filled Resin 1. Formulation: | | |
|---|---|---|---|
| Component[1] | phr, g | 100%[2] Batch, g | 500%[3] Batch, g |
| Epoxy | 100 | 81.9 | 409.3 |
| Flow Modifier | 1.5 | 1.2 | 6.1 |
| Filler | 250 | 204.6 | 1023.2 |
| Sub Total | 351.5 | 287.7 | 1438.6 |
| Hardener | 43 | 35.2 | 176.0 |
| Accelerator | 5 | 4.1 | 20.4 |
| Total | 399.5 | 327.0 | 1635.0 |

Notes:
1. Manufacturers:
Epoxy: Dow Chemical Co. XD-7818
Flow Modifier: 50% by weight mix of Monsanto Modaflow in Butyl Glycidyl Ether (BGE)
Filler: L-338 Novakup 6040 0.5, Malvern Minerals Co., Hot Springs, Ark.
Hardener: Jeffamine T-403, Jefferson Chemicals, Houston, Texas
Accelerator: 398, Jefferson Chemicals
2. The 100% batch is defined as:
Allowing for an oversized front surface coverage of 30" × 45" × .008" thick:
Weight = 30.46" × 46.64" × .008" × 16.39 × 1.755 = 327 g.
3. The 500% batch volume is 56.84 in$^3$ or .984 quart.
4. The accelerator proportion may be varied for successive pours. For example, the first pours, where levelling is an important factor, may omit the accelerator entirely.

The epoxy formulation described above has been found to be most suitable for general applications since the pot life is controllable and the flow properties are unusually favorable. However, it should be understood that one of the significant advantages of this invention is the flexibility afforded the designer with respect to the physical properties of the cured layers. For example, electrical and thermal conductance, and elastic modulus can be varied by adjusting the constituents. (The amount of filler in the present formulation was largely dictated by a desire to increase the elastic modulus.)

These considerations are usually of secondary importance for the backing layers.

Initially, two 500% batches are prepared in accordance with the previous formulation. Preferably two 1100 gram portions of the filler are placed in large flat baking dishes and baked for several hours at 250° F., stirred occasionally to remove absorbed water. Resin and flow modifier are weighed and added to a dispersing type mixer with a high shear rate such as ten-speed blender. The mixer container is then placed in the 250° F. oven to heat container and contents to the mix temperature. The mixer base is then placed on supports over an external blower for cooling the mixer. The mixer speed is increased slowly to mix and heat the resin but avoid splashing.

The filler is weighed and added slowly to the resin while mixing in at the highest speed, the mixer then stopped and the sidewalls scraped down. The mix is not permitted to cool. Thereafter, an insulating foam blanket is wrapped around the mix container, the mixer is restarted, and mixing continued at the highest speed for at least ten minutes. The resin temperature builds up to 250° F. While the mixture is hot, it is filtered through a 160 mesh screen into disposable storage beakers with tight-fitting lids to keep out dirt and moisture. Approximately 840 grams of mixture is weighed into each beaker, and the mixing process continued until 10 beakers have been filled. The beakers are then set aside to cool. Before final mixing the beakers are conditioned for several hours at 135° F. in the oven.

Referring to FIG. 5, the optical master is then dammed to the shape of the replicated optical surface. Referring to FIG. 5b, a dam 50 is shown with respective drain tubes 51 each communicating to drain cups 52.

Fabrication of the dam is illustrated in FIG. 5c. Typically, the master is protected by a spray mask which is removed from the area to be poured. The dam is basically formed of respective layers of masking tape 55, 56 and neoprene foam tape, cross-section 58, laid out along the periphery of the remaining optical mask. It should be understood that this dam on the optical master is the limit to which the replicating epoxy flows.

When the liner surface has been fully prepared, the content of two of the beakers is poured into a stainless steel mixing container, reweighed, and only the hardener added. The initial mix is typically very heavy, and the mixing is done by hand with a stiff stirrer taking care to avoid splashing. At this juncture the curing time is not critical since without the accelerator to pot life is several hours. Mixing is done very slowly and very thoroughly with frequent scraping down of the walls and bottom so that the mixing is thorough and homogeneous. Various mixers attached to variable speed motor drills may be used in the latter stages.

The accelerator is then added and mixed thoroughly with scraping of the walls and bottom by hand. The pot life with the accelerator is about 40 minutes.

Mixing occurs for about 5 minutes, the mixture then poured into a degas and pouring container and placed in a bell jar with decreased pressure. Degassing occurs for about 10 minutes to a vacuum of approximately 5 millimeters of mercury. The entire mold assembly has been placed in the oven at this point and brough to 125° F. in preparation for pouring.

A deionizing blower is used to remove any dirt or lint particles from the pour area.

The mixture should be poured immediately after it is removed from the degassing vessel.

When the oven has reached desired temperature, it is shut off. Typically, the epoxy mixture is poured as quickly as possible, starting at the liner center without entraining bubbles, then spiralling outward following the edge of the expanding pool. The flow should be centered on the liner and adjusted so that the stream flows as a solid column without folding over itself.

As the center of the mixture expands, the flowing edge stays smoothly circular for a while. Then run fingers begin to form. As they start to form, the space between them can be filled with the mixture. This requires constant attention until the pool has expanded to cover the entire surface, and run-off has begun into the drain cups.

While it is not desirable, excess material accumulating in drain cups may be transferred elsewhere to the pool perimeter, if no material remains in the pour container. It will be difficult to avoid air bubble entrainment, however.

Any bubbles that appear on the epoxy may be broken by carefully touching them with a sharpened soft wood stick. No attempt should be made to remove dirt particles that settle onto the liquid surface. A dust cover is placed over the pour area to protect it from dust generated by the oven fan during cure. The oven is then turned on.

After the material at the corner of the surface has jelled enough to not show a fingerprint impression (about 2-3 hours at approximately 125° F.), the second pour may be started. However, it is preferable to allow the first pour to cure overnight in the oven.

No preparation of the cured first pour surface is required. Simply a repeat of the steps previously laid out for the first pour is required for the second pour. The same procedure applies to all successive pours, their number being determined by the estimated thickness of each pour and the final desired thickness. Light scuffing with sandpaper between pours to provide tooth is suggested after the second pour, if the surface has fully hardened. It is convenient to reweigh the used containers after each pour and estimate the loss to determine the amount of material remaining on the surface. From the records of this value the thickness of the poured layers on the optical master can be determined and collated with the observed thickness of the layer which is seen during edge trimming of the mirror.

When the last pour is cured, oven temperature is slowly lowered until mold is at room temperature. Then the pour form illustrated in FIG. 5c is removed, and the remaining substrate procedures and rubber bonding processes can continue.

The epoxy used is nonthixotropic. The pouring operation herein described occurs under conditions of thermal equilibrium with the mold and liner in the oven at a constant temperature in the range of 120° to 150° F. The epoxy mixture is warmed to the same constant temperature, degassed and poured over the mold, making a thin uniform layer about 10 thousandths of an inch thick. This layer is allowed to almost harden before successive pours are made to increase the overall thickness of the epoxy layers atop the acrylic layer to somewhere between 40 and 60 thousandths. The assembly then should be left in the oven at least 10 hours to fully cure.

It should be noted that no release layer is used between the acrylic liner and epoxy layer. This release layer is not required because the epoxy does not bond to the acrylic so long as the acrylic surface is optically smooth.

It should further be noted that the described optical master of this invention has a replicative reusability of somewhere between 5 and closer to 15 optical surfaces.

SUBSTRATE FABRICATION

For the substrate manufacture, a master is prepared similar in both construction and dimension to the optical master shown in FIG. 4a.

On this mold, marks are placed at 30° increments from 0° to 330° around the rim of the master. The defined increments can be used to determine the alignment of glass cloth used to reinforce the backing.

The first surface of the substrate is then cast precisely as the optical replicative surface was cast, except that only two pours are needed to build up a thickness of 0.010 to 0.015 inch.

After casting, the dam is removed along with the drain cups and tubes. The cups may be weighed to determine the amount of material lost during pouring.

The cast surface is lightly scuff-sanded with 180 abrasive paper to smooth out any build-up around dirt particles and to remove the gloss and provide a laminate tooth. Debris is blown off with an air gun. The masked area of the dome is covered with butcher paper to protect it during fiberglass procedures. Glass cloth is laid out on a cutting table and cut into five oversized lengths approximately five feet square. Three batches of resin of approximately 300 grams, each of which contains 129 grams of hardener as previously described, and 15 grams of accelerator. A portion of the first batch of resin, with hardener and accelerator added and thoroughly mixed, is poured or "squeegeed" on to cover the cast surface. Successive layers of cloth are laid at differing angular alignment as measured by the angle marks on the mold rim. The cloth should first contact the center and then lay down evenly over the surface. When it is uniformly wetted with resin to the edge of the reflector outline, the cloth is trimmed just outside the reflector outline. The succeeding cloth plys are laid in 30° rotations, each thoroughly wetted with resin. The preferred resin load should consist of about 60% glass and 40% resin by weight. Masking paper is removed, and conventional and standard vacuum bag techniques are used immediately and during curing. An overnight gel at a 70° F. minimum temperature is preferred.

After the overnight gel, the assembly is placed in an oven and, by thermal procedures, the cure procedure for the front surface material is repeated.

A sheet of core bond Hexcel 5052/F40-0013 2-inch thick honeycomb, manufactured by the Hexcel Corporation of Dublin, Calif., and pre-cut to necessary dimensions, is utilized for the honeycomb layer. Conventional attachment of the honeycomb to the cured fiberglass laminate on the dome is effected by use of two 600 gram batches of Hexcel 302 core adhesive.

Two pieces of glass cloth about two inches oversized all around are cut (approximately 34×49 inches).

Outer liner masking paper is reapplied.

One of the 600 gram batches of Hexcel 302 core adhesive is mixed. Some of the adhesive is poured on the cured laminate surface and "squeegeed" to a uniform thickness. The cloth is then laid out on the resin and smoothed out. The remaining adhesive is applied to the cloth and "squeegeed" until uniformly well-coated.

Placing the core over the wet ply, the core is aligned. The core is laid down, contacting the center first and moving smoothly to the perimeter. Transverse movement of the core is avoided after contact with the wet ply. A vacuum bag is used to pull the core over the dome. It is then allowed to cure.

A batch of adhesive is evenly spread on the cutting table. The second cloth is laid on the adhesive. More adhesive is added to the cloth and "squeegeed" to uniform thickness. The cloth is then peeled off the table, inverted, and laid smoothly over the core. Conventional vacuum bag techniques are again used for cure. The back laminate is then fabricated using procedure identical to the first except reversing the direction of rotation of the plys. Then the whole structure is post cured in the oven.

At this point it is necessary to separate the laminated substrate from the acrylic dome which is the substrate master to which it is bonded. The acrylic master is first separated from its steel dome support by releasing the vacuum seal, and as shown in FIG. 7, the substrate-master combination is inverted on support frame 70. The release is effected by chilling the inside of the acrylic dome with cold nitrogen gas which is provided by introducing liquid nitrogen through tube 72. A film cover 74 is held to the acrylic dome by means of tape. The chilling and consequential shrinking of the acrylic dome results in stress at the epoxy-acrylic interface which causes a peeling phenomenon to occur, thus separating the two materials. The peeling relies on the inherent flexibility of the acrylic dome.

BONDING REFLECTIVE SURFACE TO SUBSTRATE

The process of bonding the substrate to the back of the reflective front surface may be best understood with respect to FIGS. 6a–6d. It should be kept in mind at this point that two separate assemblies have been produced. The first assembly is the first steel dome and acrylic liner with the replicated surface bonded to it. Second, and detached from its respective second mold, is a backing B. It is this backing to which the replicated optical surface is to be attached. One of the principal advantages of this is that this attachment is effected without print-through to the optical surface of any irregularites on the backing B.

RTV-602 manufactured by General Electric, Silicone Products Department, Waterford, N.Y., with 0.4% of SRC-05 catalyst is used.

Four discrete tubes (80) will have been communicated from the reverse side of the substrate B to the front side of the substrate B at the respective corners thereof. These respective tubes are placed for the purpose of permitting the introduction of a bonding rubber in the interstice defined between the reflective and replicated surface A on the backing B. A tube 92 is also placed to serve as a vacuum source to evacuate the intersticial cavity. Both surfaces are scuff sanded and primed for adhesive bonding. Around the substrate surface B there is placed a line of putty 94. Then an O-ring is located and sealed at its periphery by the putty 94. Care is taken that putty line be well outboard from tubes so as not to block flow once putty is compressed.

As can be seen, the substrate and epoxy layer are maintained with a uniform gap between then. This is accomplished by having the O-ring located between the two surfaces to be bonded. Thus, before the introduction of the silicone rubber, there is a space between the substrate and the epoxy layer which is defined at its periphery by the O-ring. It should be understood that the O-ring is prone to slippage. The O-ring, thus, is not used to contain the silicone rubber. Rather, it is used to provide the desired spacing. Conventional vacuum putty 94 provides a dam which simultaneously seals the cavity and prevents O-ring movement. The produced gap is in the order of 0.065 inches.

The silicone rubber is introduced through the tubes 80. A slight vacuum is drawn at the tube 92. This vacuum serves to withdraw air as the silicone rubber moves into fill the interstice defined between the backing B and the replicated surface A. The silicone rubber has been mixed and degassed prior to its pouring so that the vacuum pulling it into the space is not performing a degassing function. It should be understood that the vacuum that is pulling the silicone rubber into the interstice between the backing B and the replicated optical surface A is only a few inches water, just sufficient to raise the silicone rubber material from the low points of introduction to the highest point of the interstice between the backing material B and the replicated optical surface A. As soon as the silicone rubber appears at the outlet tube and no more air bubbles are noted, the vacuum is pinched off and the silicone rubber is allowed to cure, thereby bonding the front surface to the substrate.

Once the silicone rubber is cured in the interstice, it is time to release the replicated mirror from the acrylic liner, so that the entire mirror assembly can be removed intact. Up to this point, it should be understood that the replicated optical surface has been in constant contact with the acrylic liner. Likewise, the acrylic liner has been held during the entire process by vacuum to the steel dome.

Separation is accomplished in the same way as for the substrate from its master. The acrylic dome is removed from the steel dome and the whole mirror-master assembly is inverted on support frame 70.

The mirror assembly is removed from the dome by placing a uniform stress across the acrylic-replicated mirror surface A interface. This is done by quickly cooling the inside of the acrylic liner with liquid nitrogren. In order to avoid non-uniform cooling, no liquid nitrogen is allowed to collect. Rather, liquid nitrogen is used to supply a source of very cold nitrogen gas. During this cooling phase and for safety, a cover is placed over the concave acrylic liner to contain the cool gas.

After about 15 to 20 minutes, the mirror pops off the acrylic liner. It should be understood that this is not a tensile release, but rather a peeling phenomenon. The peeling occurs from the edge since the stress is at a maximum at the edge. This is due to the fact that the cooling, while being rather quick, does not result in gross in the mirror itself being cooled. While the mirror may get somewhat colder than the ambient temperature, it is most likely to remain at ambient room temperature at its edges. Thus, the stress is due to the thermal gradient across the interface. This stress will be at a maximum at the edges. Note that this peeling phenomenon relies on the inherent flexibility of the acrylic.

Virtually all applications will require that the mirror edges be trimmed to remove loose laminate edges, RTV fill tubes, etc. and to achieve the desired finished dimensions. This trimming, which may occur anywhere on the mirror surface, is feasible due to the fact that the fabrication process produces a structure that is substantially free of residual stresses. Standard glass cutting techniques are applicable.

Once the completed mirror assembly is trimmed, it can be sent out for conventional optical coating and the like. The acrylic surface of the dome is left unchanged; this acrylic is available for further and similar replications.

I claim:

1. A process of replicating a large scale optical surface comprising the steps of:
 preparing first and second substantially similar optical masters, each of said masters formed by the process of machining and grinding a rigid steel supporting surface, vacuum drawing and annealing a relatively flexible acrylic liner to said steel surface, and optically polishing said acrylic liner,
 forming on said first optical master a castable resin layer to form thereon said replicated optical surface;
 laying and fabricating on said second optical master a rigid substrate for the support of said replicated optical surface;
 flexing the acrylic liner of said second optical master to release said supporting substrate;
 placing said supporting substrate over said replicated optical surface on said first optical master at a preselected distance from the back of said replicated optical surface to form an interstice between the back surface of said replicated optical surface and the front surface of said supporting substrate;
 introducing into said interstice a rubber for bonding said replicated optical surface to said substrate so as to form a single assembly;
 continuously maintaining a vacuum between the acrylic liner and steel supporting surface of said first optical master during said pouring, placing, and introducing steps;
 releasing said vacuum to allow removal of the acrylic liner from the steel supporting surface of said first optical master; and
 separating said single assembly from said first optical master by flexing the acrylic liner of said first optical master.

2. The invention of claim 1 wherein said rubber is introduced into said interstice at the lowest points of said interstice and drawn by vacuum to the highest points of said interstice.

3. The invention of claim 1 wherein said masters are convex.

4. The process of claim 1 wherein said flexing of said acrylic liners of optical masters comprises cooling said acrylic liners.

5. A process of forming a large scale optical quality mirror on, and separating said mirror from an optical master, comprising the steps of:
 providing a rigid steel supporting surface;
 laying to said steel surface a relatively flexible acrylic layer;
 conforming said acrylic layer to said steel surface;
 annealing said acrylic layer to relieve residual stresses;
 communicating a vacuum to the interface between said steel surface and said acrylic layer;
 pouring on said acrylic layer a non-shrinking castable resin layer of substantially uniform thickness;
 providing a rigid substrate having a front surface generally matching the contour of said resin layer;
 elastomerically bonding said substrate to said castable resin layer to form a rigid mirror assembly; and flexing said acrylic layer to release said mirror assembly.

6. The process of claim 5 wherein said flexing is accomplished by nitrogen cooling of said layer of acrylic.

7. The process of claim 5 wherein said flexing of said acrylic layer is effected with said acrylic layer separated from said steel surface.

8. The process of claim 5 wherein said master is convex.

9. The process of claim 5 wherein said bonding step comprises the substeps of:

placing said substrate over said castable resin layer on said first optical master at a preselected distance from the back of said castable resin layer to from an interstice between the back surface of said castable resin layer and the front surface of said substrate; and introducing into said interstice a uniform layer of an elastomeric material.

10. A process of replicating a large scale optical quality surface on an optical master formed by the process of machining and grinding a steel supporting surface, vacuum drawing and annealing an acrylic liner to said steel surface, and optically polishing said liner comprising the steps of:

pouring on said master a castable resin layer to form thereon said replicated optical surface;

providing a rigid substrate for the support of said replicated optical surface, said substrate having a front surface generally matching the contour of said castable resin layer;

placing said substrate at a preselected distance from said castable resin layer on said master to define an interstice;

introducing a substantially uniform layer of elastomeric material into said interstice to form a bonded rigid assembly; and flexing the acrylic liner to release said large scale optical surface.

11. The process of claim 10 wherein said flexing is accomplished by nitrogen cooling of said layer of acrylic.

12. The process of claim 10 wherein said master is convex.

13. A process of replicating a large scale optical surface comprising the steps of:

forming a castable resin layer on an optical master having an optically polished surface, said castable resin layer having a front surface in contact with said optical master to define the optical surface to be repli cated and a rear surface;

providing a substrate having a front surface generally matching the contour of said castable resin layer;

placing said substrate over said castable resin layer while said castable resin layer is still on said optical master at a preselected distance from said rear surface of said castable resin layer to form an interstice between said rear surface of said castable resin layer and front surface of said substrate;

introducing into said interstice an elastomeric material for bonding said castable resin layer to said substrate to form a single assembly; and separating said single assembly from said optical master.

14. The invention of claim 13 comprising the steps, carried out before said step of providing a substrate, of:

providing a second optical master having a polished surface corresponding to the optically polished surface of said first-mentioned optical master;

fabricating thereon said substrate; and separating said substrate from said second optical master.

15. The invention of claim 13 wherein said optical master includes an acrylic liner on a steel surface and wherein said step of separating said single assembly from said optical master comprises the step of flexing said acrylic liner.

16. The invention of claim 13 wherein said elastomeric material is introduced into said interstice at a lowermost region thereof and drawn by vacuum to an uppermost region thereof.

* * * * *